US007077538B2

(12) United States Patent
Wooldridge (10) Patent No.: US 7,077,538 B2
(45) Date of Patent: Jul. 18, 2006

(54) INSTRUMENTED GARMENT

(76) Inventor: William Wooldridge, 1245 W. Wetmore, Tucson, AZ (US) 85705

( * ) Notice: Subject to any disclaimer, the term of this patent is extended or adjusted under 35 U.S.C. 154(b) by 149 days.

(21) Appl. No.: 10/772,671

(22) Filed: Feb. 4, 2004

(65) Prior Publication Data

US 2004/0156215 A1    Aug. 12, 2004

Related U.S. Application Data

(60) Provisional application No. 60/445,194, filed on Feb. 4, 2003.

(51) Int. Cl.
*F21V 21/08* (2006.01)

(52) U.S. Cl. ............... 362/103; 362/108; 362/276; 362/473

(58) Field of Classification Search .......... 40/200–211, 40/553, 586, 425.5; 362/475, 497–499, 570, 362/276, 802
See application file for complete search history.

(56) References Cited

U.S. PATENT DOCUMENTS

| | | | | |
|---|---|---|---|---|
| 1,436,854 A * | 11/1922 | Brady | | 40/586 |
| 2,821,035 A * | 1/1958 | Joseph | | 40/586 |
| 5,339,550 A * | 8/1994 | Hoffman | | 40/544 |
| 6,538,567 B1 * | 3/2003 | Stewart | | 340/475 |
| 6,558,016 B1 * | 5/2003 | Restauro | | 362/103 |
| 6,679,615 B1 * | 1/2004 | Spearing | | 362/103 |
| 6,834,395 B1 * | 12/2004 | Fuentes | | 2/69 |
| 2002/0044052 A1 * | 4/2002 | Stewart | | 340/475 |
| 2003/0107903 A1 * | 6/2003 | Melton | | 362/570 |

* cited by examiner

*Primary Examiner*—Thomas M. Sember
*Assistant Examiner*—Adam C. Rehm
(74) *Attorney, Agent, or Firm*—Dale F. Regelman

(57) ABSTRACT

An instrumented garment is disclosed. The garment includes a vest portion, comprising a front portion and a rear portion. The garment further includes a first light emitting device disposed on the rear portion and a second light emitting device disposed on the rear portion. The first light emitting device is capable of receiving a first signal, provided by a vehicle comprising one or more wheels. The second light emitting device is capable of receiving a second signal provided by that vehicle.

20 Claims, 12 Drawing Sheets

FIG. 11

INSTRUMENTED GARMENT

This application claims the benefit of Provisional Application No. 60/445,194, filed Feb. 04, 2003.

FIELD OF THE INVENTION

Applicant's invention comprises an instrumented garment. In certain embodiments, Applicant's instrumented garment can be worn while operating a motorized vehicle, including without limitation a motorcycle, an all terrain vehicle, and the like. In certain embodiments, Applicant's instrumented garment can be worn while operating a non-motorized vehicle, including without limitation a bicycle, a skate board, and the like.

BACKGROUND OF THE INVENTION

Motorcycling is a popular form of transport, and seems to be increasing after a long period of decline, especially amongst riders of large, powerful machines. However, motorcyclists are also one of the most vulnerable road users, and the number killed rose by 10% between 1998 and 1999. Unfortunately, travel data about motorcycle use is fairly sparse, and does not capture the full level of motorcycling. There is also very little published data to indicate the level of motorcycle use between different age groups and on different types and sizes of motorcycle. Such data would be very useful in estimating accident risk and rates.

Research indicates that the prime cause of most motorcycle accidents is the actions of other road users, especially car drivers. Failing to anticipate the presence and likely actions of a motorcyclist, and emerging from a junction into the path of a rider are common errors. Most motorcycle accidents occur on urban roads at relatively low speeds.

It is known in the art that protective clothing that contains fluorescent and reflective material will increase the conspicuity of the rider, and hence help to reduce the likelihood of an accident occurring in the first place. What is needed, however, is protective clothing that includes a plurality of light emitting devices to further enhance the visibility of both the motorcycle rider and the motorcycle itself.

SUMMARY OF THE INVENTION

In certain embodiments, Applicant's invention includes an instrumented garment, and a method to use that instrumented garment. In certain embodiments, Applicant's instrumented garment includes turn signal lights/brake lights which can be remotely operated. In certain embodiments, Applicant's instrumented garment further includes a license plate and a lighting device to illuminate that license plate. In certain embodiments, Applicant's garment is fabricated from naturally-occurring materials, including without limitation, leather, suede, wool, cotton, and combinations thereof. In certain embodiments, Applicant's instrumented garment is fabricated from synthetic materials, including without limitation, polyester, nylon, rayon, polyimide, polyamideimide, plasticized polyvinylchloride, and the like, and combinations thereof. In certain embodiments, Applicant's instrumented garment is fabricated from one or more naturally-occurring materials in combination with one or more synthetic materials.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the Figures. The invention will be described as embodied in garment worn when operating a motorcycle. The following description of Applicant's apparatus and method is not meant, however, to limit Applicant's invention to motorcycle jackets/vests. Rather, Applicants' apparatus and method can be used when operating a motor vehicle or a non-motor vehicle.

Figure 1:
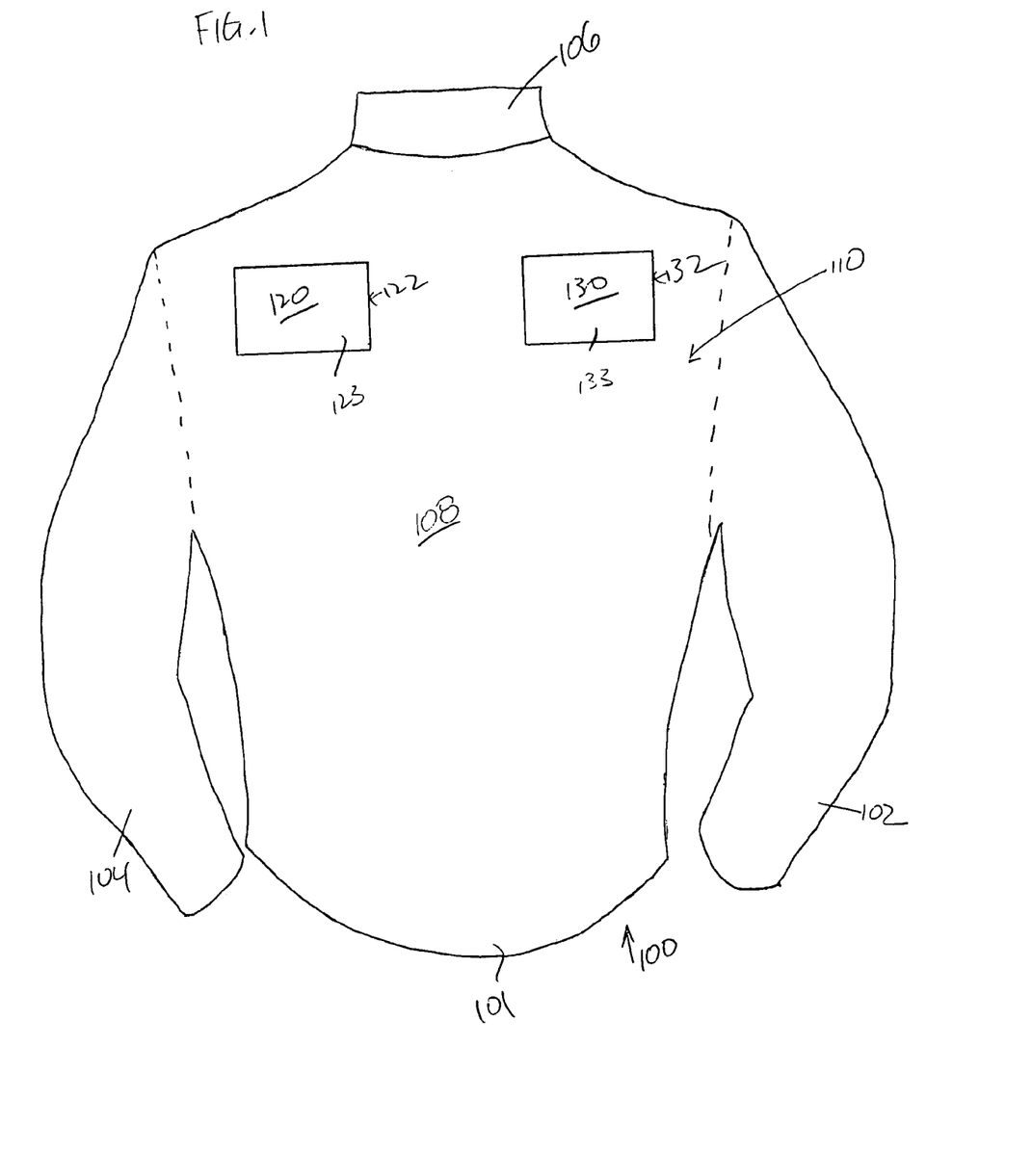
FIG. 1 is a perspective view showing the back portion of one embodiment of Applicants' instrumented garment.

Referring now to FIG. 1, Applicant's garment 100 includes a vest portion 108, a first sleeve portion 102, a second sleeve portion 104, and a back portion 110. In certain embodiments, garment 100 optionally includes collar portion 106. Although FIG. 1 shows a jacket, Applicant's invention also includes vest-type garments, i.e. sleeve-less garments, comprising vest portion 108 but not sleeve portions 102 and 104.

Back portion 110 further includes a visible light emitting device 120 and a visible light emitting device 130. Garment 100 further includes circuitry and one or more power sources such that both visible light emitter 120 and visible light emitter 130 can be remotely operated. For certain purposes, visible light emitter 120 can be operated separately from visible light emitter 130. In certain embodiments, upon being remotely activated visible emitter 120 flashes on and off periodically. In certain embodiments, upon being remotely activated visible emitter 130 flashes on and off periodically. In these embodiments, first visible light emitter 120 and second visible light emitter 130 can function as turn signals when the garment's wearer is operating, for example, a motorcycle or a bicycle.

In certain embodiments, visible light emitter 120 and visible light emitter 130 can be operated simultaneously and continuously. In these embodiments, visible light emitter 120 and visible light emitter 130 in combination may comprise tail lights/brake lights for a motorcycle/bicycle being operated at night. In certain of these embodiments, visible light emitter 120 and visible light emitter 130 can be operated non-continuously, i.e. these devices can flash on and off. In these embodiments, visible light emitter 120 and visible light emitter 130 can function as an emergency warning signal.

In certain embodiments, light emitter 120 and light emitter 130 comprise one or more incandescent bulbs disposed in a housing 122 and 132, respectively. Housing 122 is formed from an optically transparent material, and comprises an enclosure having an open end. Housing 122 can be formed from, without limitation, polyethylene, polypropylene, polycarbonate, polystyrene, combinations thereof, and the like. In certain embodiments, housing 122 is colored. In certain embodiments, the open end of housing 122 is covered by a removeable red lens 123.

Housing 132 is formed from an optically transparent material, and comprises an enclosure having an open end. Housing 132 can be formed from, without limitation, polyethylene, polypropylene, polycarbonate, polystyrene, combinations thereof, and the like. In certain embodiments, housing 132 is colored. In certain embodiments, the open end of housing 132 is covered by a removeable red lens 133.

In certain embodiments, visible light emitter 120 comprises one or more light emitting diodes ("LEDs") disposed in housing 122. In certain embodiments, those LEDs emit white light. In certain embodiments, those LEDs comprise 10 mm Super Diffused White Lamps sold in commerce by LC LED Company under Product No. 810TB2D. In certain embodiments, those LEDs comprise 4-Pin Super Flux White LED Lamps sold in commerce by LC LED Company under Product No. Q760TW4D. In certain embodiments, those LEDs emit red light. In certain embodiments, those LEDs comprise 10 mm Big Super Red LED Lamps sold in commerce by LC LED Company under Product No. 810JPF4D. In certain embodiments, those LEDs comprise 4-Pin Super Flux Red Lamps sold in commerce by LC LED Company under Product No. Q760JPF4D. In certain embodiments, those LEDs emit amber light. In certain embodiments, those LEDs comprise a plurality of 4-PIN Super Flux Amber LED Lamps sold in commerce by LC LED Company under Product No. Q760JPT4D.

In certain embodiments, visible light emitter 130 comprises one or more light emitting diodes ("LEDs") disposed in housing 132. In certain embodiments, those LEDs emit white light. In certain embodiments, those LEDs comprise 10 mm Super Diffused White Lamps sold in commerce by LC LED Company under Product No. 810TB2D. In certain embodiments, those LEDs comprise 4-Pin Super Flux White LED Lamps sold in commerce by LC LED Company under Product No. Q760TW4D. In certain embodiments, those LEDs emit red light. In certain embodiments, those LEDs comprise 10 mm Big Super Red LED Lamps sold in commerce by LC LED Company under Product No. 810JPF4D. In certain embodiments, those LEDs comprise 4-Pin Super Flux Red Lamps sold in commerce by LC LED Company under Product No. Q760JPF4D. In certain embodiments, those LEDs emit amber light. In certain embodiments, those LEDs comprise 4-PIN Super Flux Amber LED Lamps sold in commerce by LC LED Company under Product No. Q760JPT4D. In certain embodiments, those LEDs comprise a plurality of 10 mm "Super Red LED Lamps" sold in commerce by LC LED Company.

In certain embodiments, visible light emitter 120 comprises one or more flexible neon light assemblies disposed in housing 122. In certain embodiments, the one or more flexible neon assemblies emit white light. In certain embodiments, the one or more flexible neon assemblies emit red light. In certain embodiments, visible light emitter 130 comprises one or more the one or more flexible neon assemblies disposed in housing 132. In certain embodiments, the one or more flexible neon assemblies emit white light. In certain embodiments, the one or more flexible neon assemblies emit red light.

Figure 2:
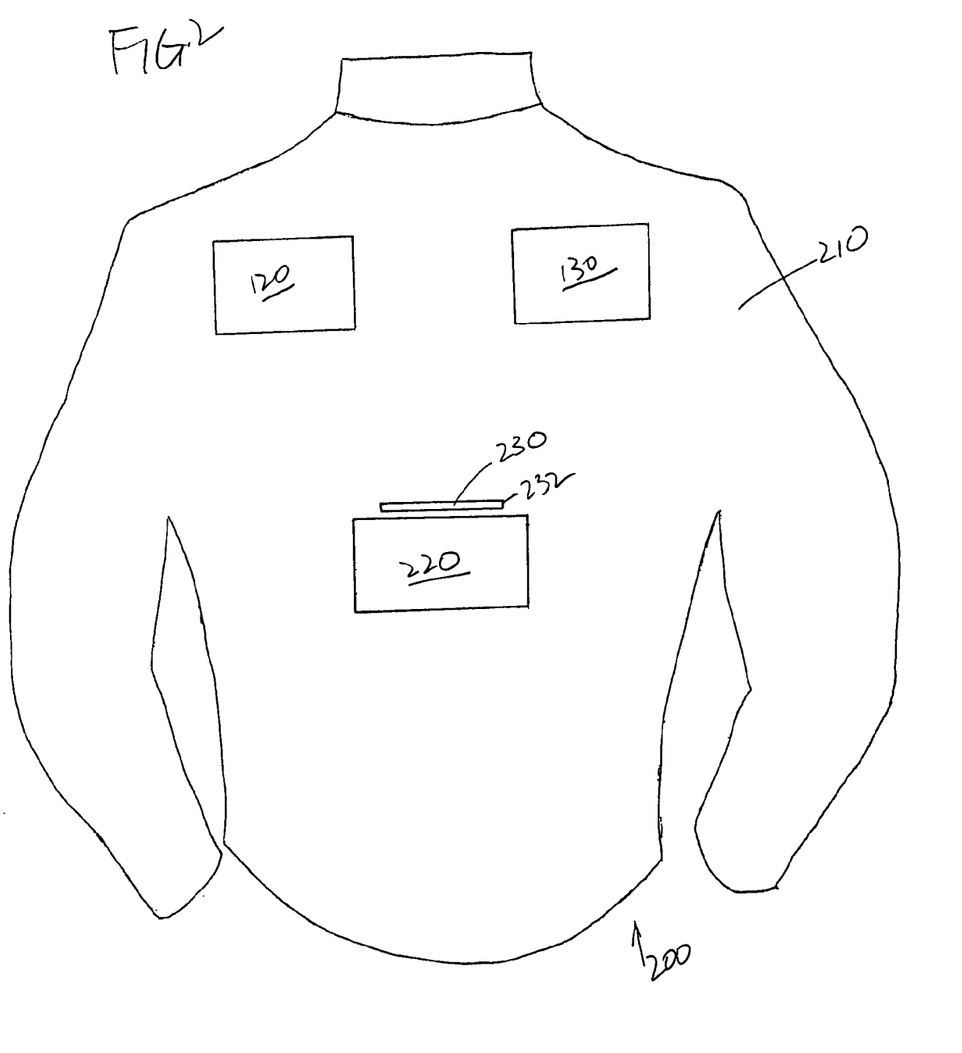
FIG. 2 is a perspective view showing the back portion of a second embodiment of Applicants' instrumented garment.

Referring now to FIG. 2, in certain embodiments Applicant's instrumented garment further includes license plate 220. In certain of these embodiments, Applicant's instrumented garment further includes visible light emitter 230. In certain embodiments, visible light emitter 230 can be operated remotely. In certain embodiments, visible light emitter 230 further comprises housing 232. Housing 232 is formed from an optically transparent material. Housing 232 can be formed from, without limitation, polyethylene, polypropylene, polycarbonate, polystyrene, combinations thereof, and the like.

In certain embodiments, visible light emitter 230 comprises one or more incandescent light bulbs. In certain embodiments, visible light emitter 230 comprises one or more LEDs. In certain embodiments, visible light emitter 230 comprises a plurality of 10 mm Super White LED Lamps sold in commerce by LC LED Company.

Figure 3:
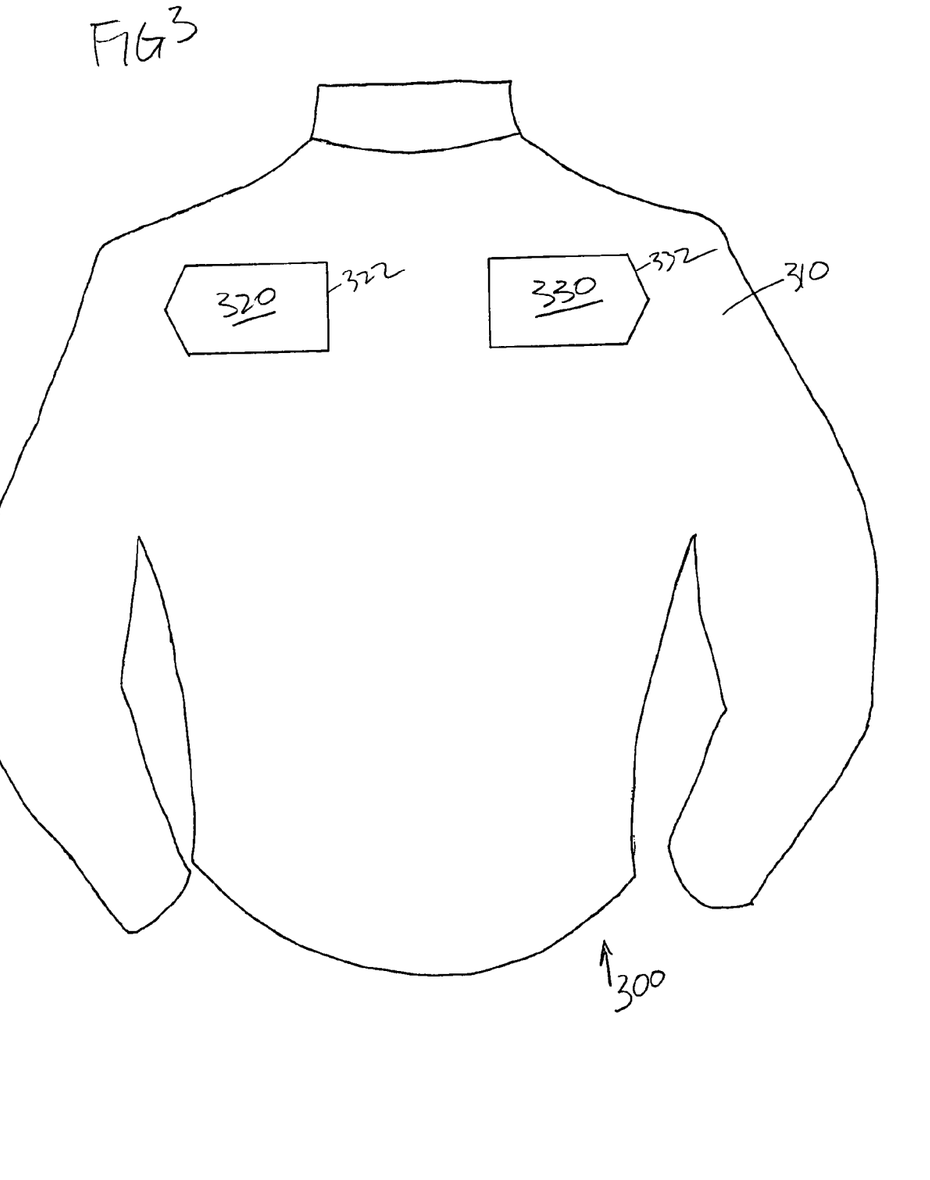
FIG. 3 is a perspective view showing the back portion of a third embodiment of Applicants' instrumented garment.

Referring now to FIG. 3, garment 300 includes light emitter 320 and light emitter 330. Garment 300 further includes circuitry and one or more power sources such that both visible light emitter 320 and visible light emitter 330 can be remotely operated. For certain purposes, visible light emitter 320 can be operated separately from visible light emitter 330. In certain embodiments, upon being remotely activated visible emitter 320 flashes on and off periodically. In certain embodiments, upon being remotely activated visible emitter 330 flashes on and off periodically. In these embodiments, first visible light emitter 320 and second visible light emitter 330 can function as turn signals/brake lights when the garment's wearer is operating, for example, a motorcycle or a bicycle.

In certain embodiments, visible light emitter 320 and visible light emitter 330 can be operated simultaneously and continuously. In these embodiments, visible light emitter 320 and visible light emitter 330 in combination may comprise tail lights/brake light for a motorcycle/bicycle. In certain of these embodiments, visible light emitter 320 and visible light emitter 330 can be operated non-continuously, i.e. these devices can flash on and off. In these embodiments, visible light emitter 320 and visible light emitter 330 can function as an emergency warning signal.

In certain embodiments, light emitter 320 and light emitter 330 comprise one or more incandescent bulbs disposed in a housing 322 and 332, respectively. Housing 322 is formed from an optically transparent material. Housing 322 can be formed from, without limitation, polyethylene, polypropylene, polycarboriate, polystyrene, combinations thereof, and the like. In certain embodiments, housing 322 is colored. In certain embodiments, housing 322 comprises an optical transparent, red housing.

Housing 332 is formed from an optically transparent material. Housing 332 can be formed from, without limitation, polyethylene, polypropylene, polycarbonate, polystyrene, combinations thereof, and the like. In certain embodiments, housing 332 is colored. In certain embodiments, housing 332 comprises an optical transparent, red housing.

In certain embodiments, visible light emitter 320 comprises one or more light emitting diodes ("LEDs") disposed in housing 322. In certain embodiments, those LEDs emit white light. In certain embodiments, those LEDs comprise 10 mm Super Diffused White Lamps sold in commerce by LC LED Company under Product No. 810TB2D. In certain embodiments, those LEDs comprise 4-Pin Super Flux White LED Lamps sold in commerce by LC LED Company under Product No. Q760TW4D. In certain embodiments, those LEDs emit In certain embodiments, those LEDs comprise 10 mm Big Super Red LED Lamps sold in commerce by LC LED Company under Product No. 810JPF4D. In certain embodiments, those LEDs comprise 4-Pin Super Flux Red Lamps sold in commerce by LC LED Company under Product No. Q760JPF4D. In certain embodiments, those LEDs emit amber light. In certain embodiments, those LEDs comprise 4-PIN Super Flux Amber LED Lamps sold in commerce by LC LED Company under Product No. Q760JPT4D. In certain embodiments, those LEDs comprise a plurality of 10 mm "Super Red LED Lamps" sold in commerce by LC LED Company.

In certain embodiments, visible light emitter 330 comprises one or more light emitting diodes ("LEDs") disposed in housing 332. In certain embodiments, those LEDs emit white light. In certain embodiments, those LEDs comprise 10 mm Super Diffused White Lamps sold in commerce by LC LED Company under Product No. 810TB2D. In certain embodiments, those LEDs comprise 4-Pin Super Flux White LED Lamps sold in commerce by LC LED Company under Product No. Q760TW4D. In certain embodiments, those LEDs emit red light. In certain embodiments, those LEDs comprise 10 mm Big Super Red LED Lamps sold in commerce by LC LED Company under Product No. 810JPF4D. In certain embodiments, those LEDs comprise 4-Pin Super Flux Red Lamps sold in commerce by LC LED Company under Product No. Q760JPF4D. In certain embodiments, those LEDs emit amber light. In certain embodiments, those LEDs comprise 4-PIN Super Flux Amber LED Lamps sold in commerce by LC LED Company under Product No. Q760JPT4D. In certain embodiments, those LEDs comprise a plurality of 10 mm "Super Red LED Lamps" sold in commerce by LC LED Company.

Figure 4:
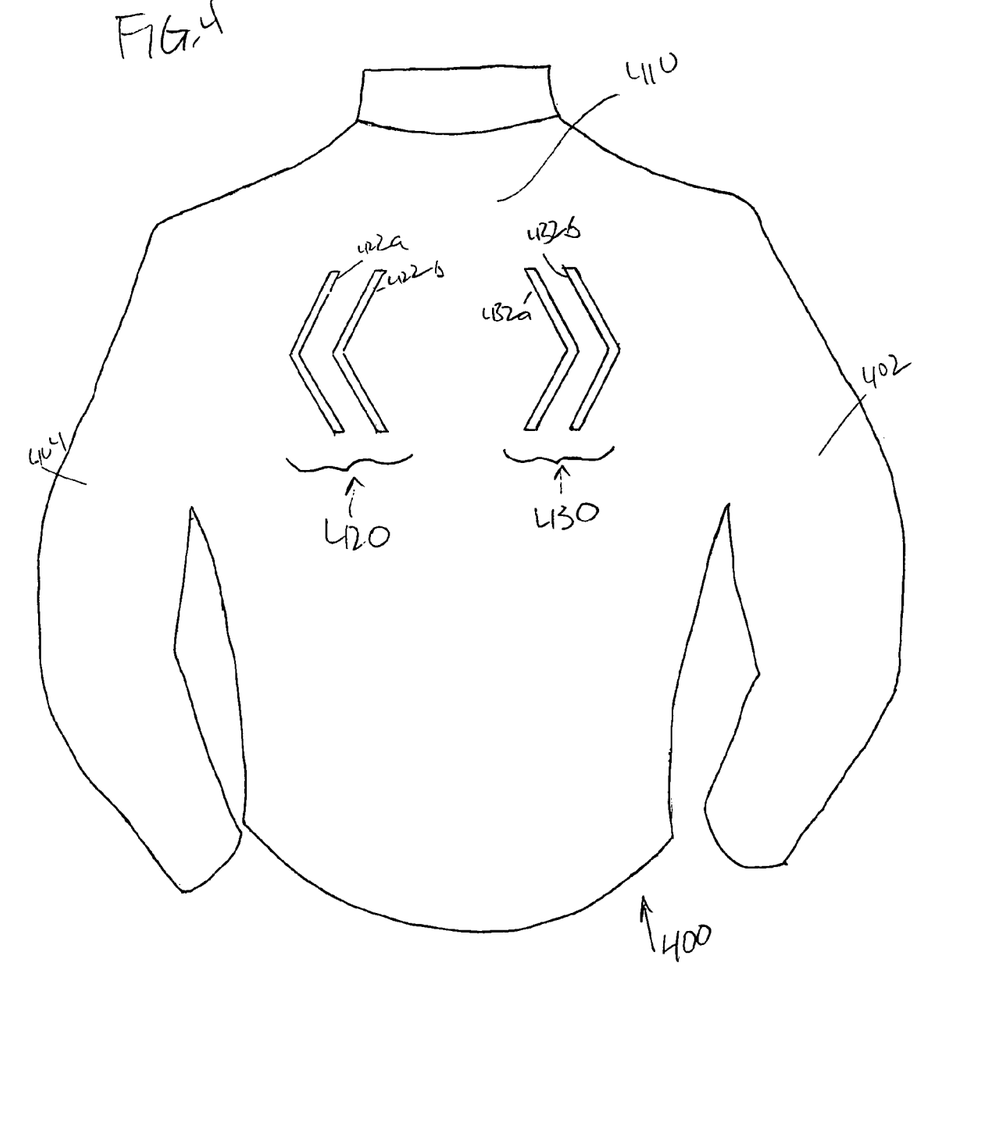
FIG. 4 is a perspective view showing the back portion of a fourth embodiment of Applicants' instrumented garment.

Referring now to FIG. 4, garment 400 includes visible light emitter assembly 420 and visible light emitter assembly 430. In the embodiment shown in FIG. 4, emitter assembly 420 comprises a pair of parallel chevrons disposed on back portion 410 and pointing toward sleeve 404. In other embodiments, emitter assembly 420 comprises a single chevron. In other embodiments, emitter assembly 420 comprises more than 2 chevrons.

In the illustrated embodiment of FIG. 4, emitter assembly 430 comprises a pair of parallel chevrons disposed on back portion 410 and pointing toward sleeve 402. In other embodiments, emitter assembly 430 comprises a single chevron. In other embodiments, emitter assembly 430 comprises more than 2 chevrons.

Garment 400 further includes circuitry and one or more power sources such that both visible light emitter 420 and visible light emitter 430 can be remotely operated. For certain purposes, visible light emitter 420 can be operated separately from visible light emitter 430. In certain embodiments, upon being remotely activated visible emitter 420 flashes on and off periodically. In certain embodiments, upon being remotely activated visible emitter 430 flashes on and off periodically. In these embodiments, first visible light emitter 420 and second visible light emitter 430 can function as turn signals when the garment's wearer is operating, for example, a motorcycle or a bicycle.

In certain embodiments, visible light emitter 420 and visible light emitter 430 can be operated simultaneously and continuously. In these embodiments, visible light emitter 420 and visible light emitter 430 in combination may comprise tail lights/brake lights for a motorcycle/bicycle being operated at night. In certain of these embodiments, visible light emitter 420 and visible light emitter 430 can be operated non-continuously, i.e. these devices can flash on and off. In these embodiments, visible light emitter 420 and visible light emitter 430 can function as an emergency warning signal.

In certain embodiments, light emitter assembly 420 and light emitter assembly 430 comprise one or more incandescent light bulbs disposed in one or more housings 422a, 422b, 432a, and 432b, respectively. Housings 422a, 422b, 432a, 432b, are formed from an optically transparent material. Those housings can be formed from, without limitation, polyethylene, polypropylene, polycarbonate, polystyrene, combinations thereof, and the like. In certain embodiments, those housing are colored. In certain embodiments, lens 423a, 423b, 433a, and 433b, respectively, are disposed over the open ends of housings 422a, 422b, 432a, 432b, respectively.

In certain embodiments, visible light emitter assembly 420 comprises a plurality of light emitting diodes ("LEDs") disposed in housings 422a and 422b. In certain embodiments, those LEDs emit white light. In certain embodiments, those LEDs comprise 10 mm Super Diffused White Lamps sold in commerce by LC LED Company under Product No. 810TB2D. In certain embodiments, those LEDs comprise 4-Pin Super Flux White LED Lamps sold in commerce by LC LED Company under Product No. Q760TW4D. In certain embodiments, those LEDs emit red light. In certain embodiments, those LEDs comprise 10 mm Big Super Red LED Lamps sold in commerce by LC LED Company under Product No. 810JPF4D. In certain embodiments, those LEDs comprise 4-Pin Super Flux Red Lamps sold in commerce by LC LED Company under Product No. Q760JPF4D. In certain embodiments, those LEDs emit amber light. In certain embodiments, those LEDs comprise 4-PIN Super Flux Amber LED Lamps sold in commerce by LC LED Company under Product No. Q760JPT4D. In certain embodiments, those LEDs comprise a plurality of 10 mm "Super Red LED Lamps" sold in commerce by LC LED Company.

In certain embodiments, visible light emitter assembly 430 comprises a plurality of light emitting diodes ("LEDs") disposed in housings 432a, and 432b. In certain embodiments, those LEDs emit white light. In certain embodiments, those LEDs comprise 10 mm Super Diffused White Lamps sold in commerce by LC LED Company under Product No. 810TB2D. In certain embodiments, those LEDs comprise 4-Pin Super Flux White LED Lamps sold in commerce by LC LED Company under Product No. Q760TW4D. In certain embodiments, those LEDs emit red light. In certain embodiments, those LEDs comprise 10 mm Big Super Red LED Lamps sold in commerce by LC LED Company under Product No. 810JPF4D. In certain embodiments, those LEDs comprise 4-Pin Super Flux Red Lamps sold in commerce by LC LED Company under Product No. Q760JPF4D. In certain embodiments, those LEDs emit amber light. In certain embodiments, those LEDs comprise 4-PIN Super Flux Amber LED Lamps sold in commerce by LC LED Company under Product No. Q760JPT4D. In certain embodiments, those LEDs comprise a plurality of 10 mm "Super Red LED Lamps" sold in commerce by LC LED Company.

Figure 8:
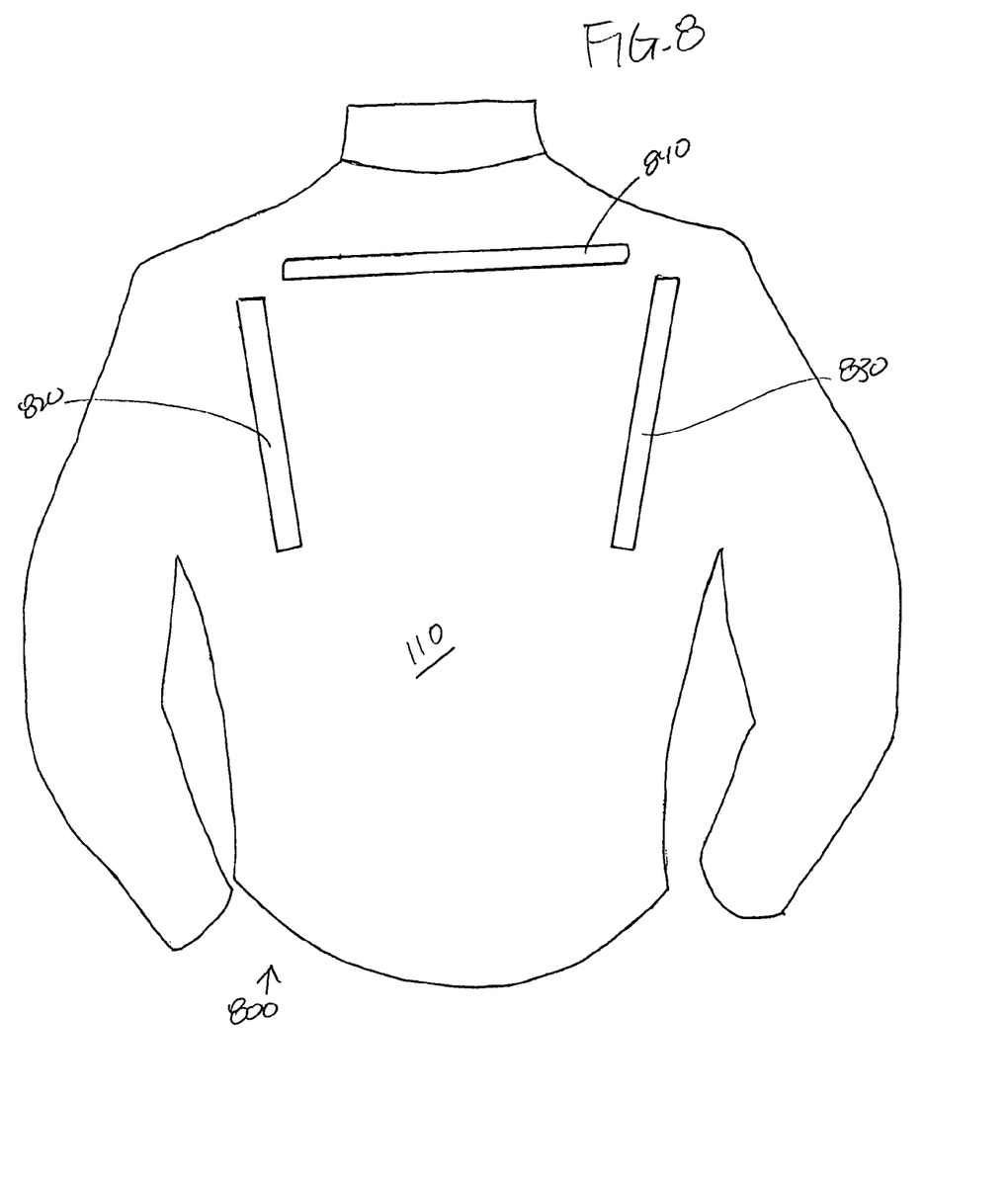
FIG. 8 is a perspective view showing the back portion of a fifth embodiment of Applicants' instrumented garment.

Referring now to FIG. 8, garment 800 includes light emitter 820, light emitter 830, and light emitter 840. Garment 800 further includes circuitry and one or more power sources such that visible light emitter 820, visible light emitter 830, and visible light emitter 840, can be remotely operated, either singly or in combination. For certain purposes, visible light emitter 820 can be operated separately from visible light emitters 830 and 840. In certain embodiments, upon being remotely activated visible emitter 820 flashes on and off periodically. In certain embodiments, upon being remotely activated visible emitter 830 flashes on and off periodically. In these embodiments, first visible light emitter 820 and second visible light emitter 830 can function as turn signals when the garment's wearer is operating, for example, a motorcycle or a bicycle.

In certain embodiments, visible light emitter 820 and visible light emitter 830 can be operated simultaneously and continuously. In these embodiments, visible light emitter 820 and visible light emitter 830 in combination may comprise tail lights/brake lights for a motorcycle/bicycle. In certain of these embodiments, visible light emitter 820 and visible light emitter 830 can be operated non-continuously, i.e. these devices can flash on and off. In these embodiments, visible light emitter 820 and visible light emitter 830 can function as an emergency warning signal.

In certain embodiments, visible light emitter 840 functions as a brake light. In certain embodiments, visible light emitters 820, 830, and 840 can be operated simultaneously and continuously. In these embodiments, visible light emitters 820, 830, and 840 in combination may comprise brake lights for a motorcycle/bicycle. In certain of these embodiments, visible light emitters 820, 830, and 840, can be operated non-continuously, i.e. these devices can flash on and off. In these embodiments, visible light emitters 820, 830, and 840, can function as an emergency warning signal.

Figure 9:
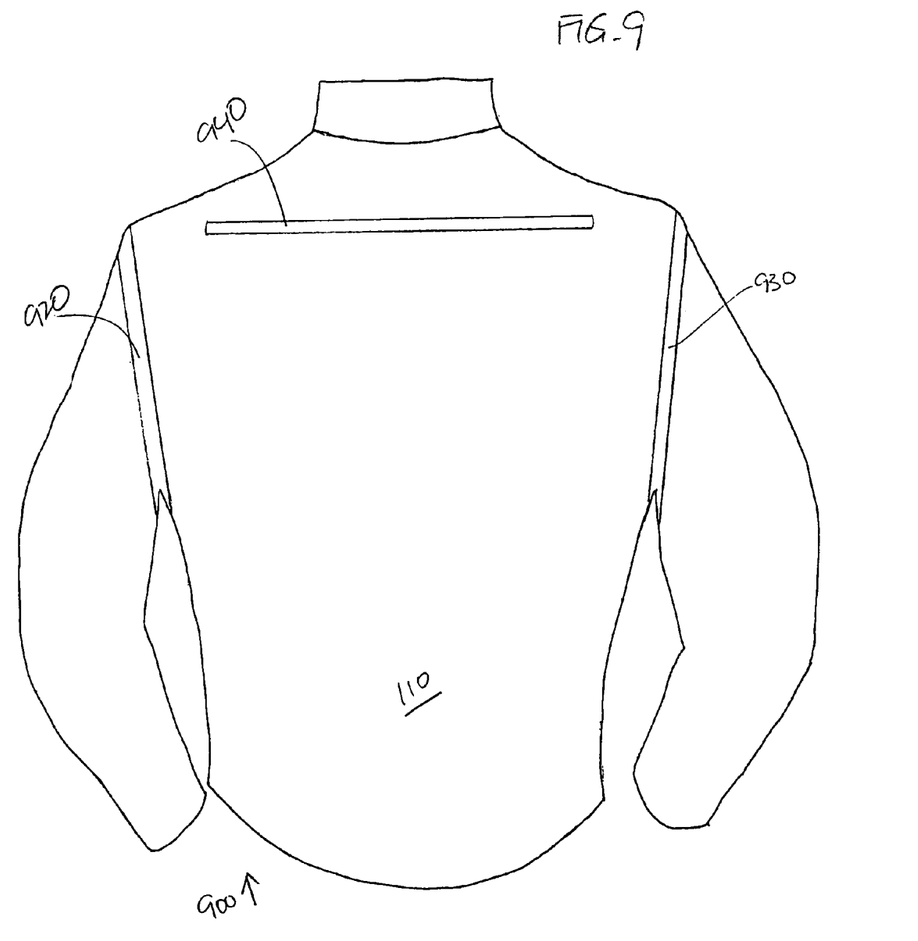
FIG. 9 is a perspective view showing the back portion of a sixth embodiment of Applicants' instrumented garment.

Referring now to FIG. 9, garment 900 includes light emitter 920, light emitter 930, and light emitter 940. Garment 900 further includes circuitry and one or more power sources such that visible light emitter 920, visible light emitter 930, and visible light emitter 940, can be remotely operated, either singly or in combination. For certain purposes, visible light emitter 920 can be operated separately from visible light emitters 930 and 940. In certain embodiments, upon being remotely activated visible emitter 920 flashes on and off periodically. In certain embodiments, upon being remotely activated visible emitter 930 flashes on and off periodically. In these embodiments, first visible light emitter 920 and second visible light emitter 930 can function as turn signals when the garment's wearer is operating, for example, a motorcycle or a bicycle.

In certain embodiments, visible light emitter 920 and visible light emitter 930 can be operated simultaneously and continuously. In these embodiments, visible light emitter 920 and visible light emitter 930 in combination may comprise tail lights for a motorcycle/bicycle. In certain of these embodiments, visible light emitter 920 and visible light emitter 930 can be operated non-continuously, i.e. these devices can flash on and off. In these embodiments, visible light emitter 920 and visible light emitter 930 can function as an emergency warning signal.

In certain embodiments, visible light emitter 940 functions as a brake light. In certain embodiments, visible light emitters 920, 930, and 940 can be operated simultaneously and continuously. In these embodiments, visible light emitters 920, 930, and 940 in combination may comprise brake lights for a motorcycle/bicycle. In certain of these embodiments, visible light emitters 920, 930, and 940, can be operated non-continuously, i.e. these devices can flash on and off. In these embodiments, visible light emitters 920, 930, and 940, can function as an emergency light signal.

Figure 10:
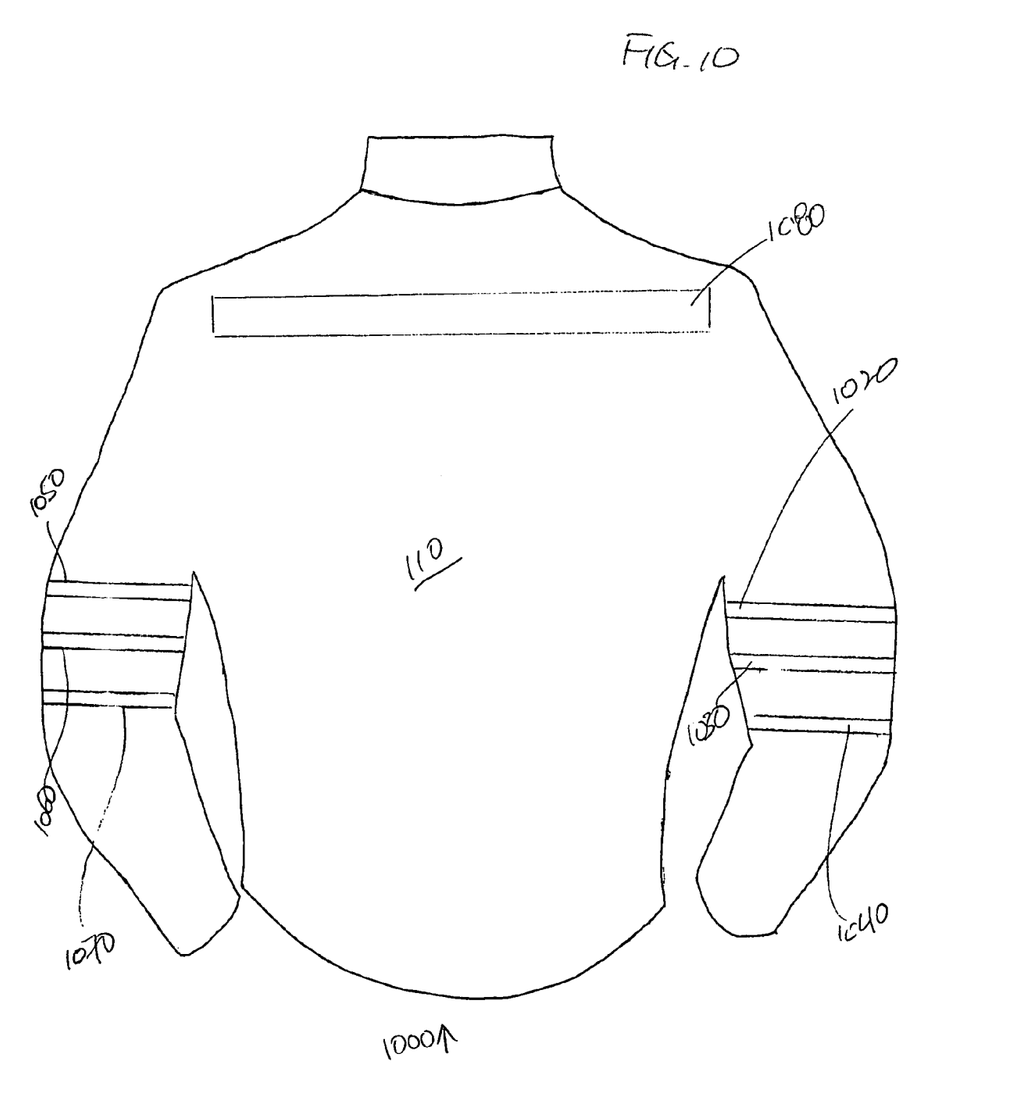
FIG. 10 is a perspective view showing the back portion of a seventh embodiment of Applicants' instrumented garment.

Referring now to FIG. 10, garment 1000 includes light emitters 1020, 1030, 1040, 1050, 1060, 1070, and 1080. Garment 1000 further includes circuitry and one or more power sources such that visible light emitters 1020, 1030, 1040, 1050, 1060, 1070, and 1080 can be remotely operated, either singly or in combination. For certain purposes, visible light emitters 1020, 1030, and 1040, can be operated separately from visible light emitters 1060, 1060, 1070, and 1080.

In certain embodiments, visible light emitters 1020, 1030, 1040, 1050, 1060, 1070, and 1080 can be operated simultaneously and continuously. In these embodiments, visible light emitters 1020, 1030, 1040, 1050, 1060, 1070, and 1080 in combination may comprise tail lights for a motorcycle/bicycle. In certain of these embodiments, visible light emitters 1020, 1030, 1040, 1050, 1060, 1070, and 1080 can be operated non-continuously, i.e. these devices can flash on and off. In these embodiments, visible light emitters 1020, 1030, 1040, 1050, 1060, 1070, and 1080 can function as an emergency warning signal.

In certain embodiments, visible light emitter 1080 functions as a brake light. In certain embodiments, visible light emitters 1020, 1030, 1040, 1050, 1060, 1070, and 1080 can be operated simultaneously and continuously. In these embodiments, visible light emitters 1020, 1030, 1040, 1050, 1060, 1070, and 1080 in combination may comprise brake lights for a motorcycle/bicycle.

Figure 11:
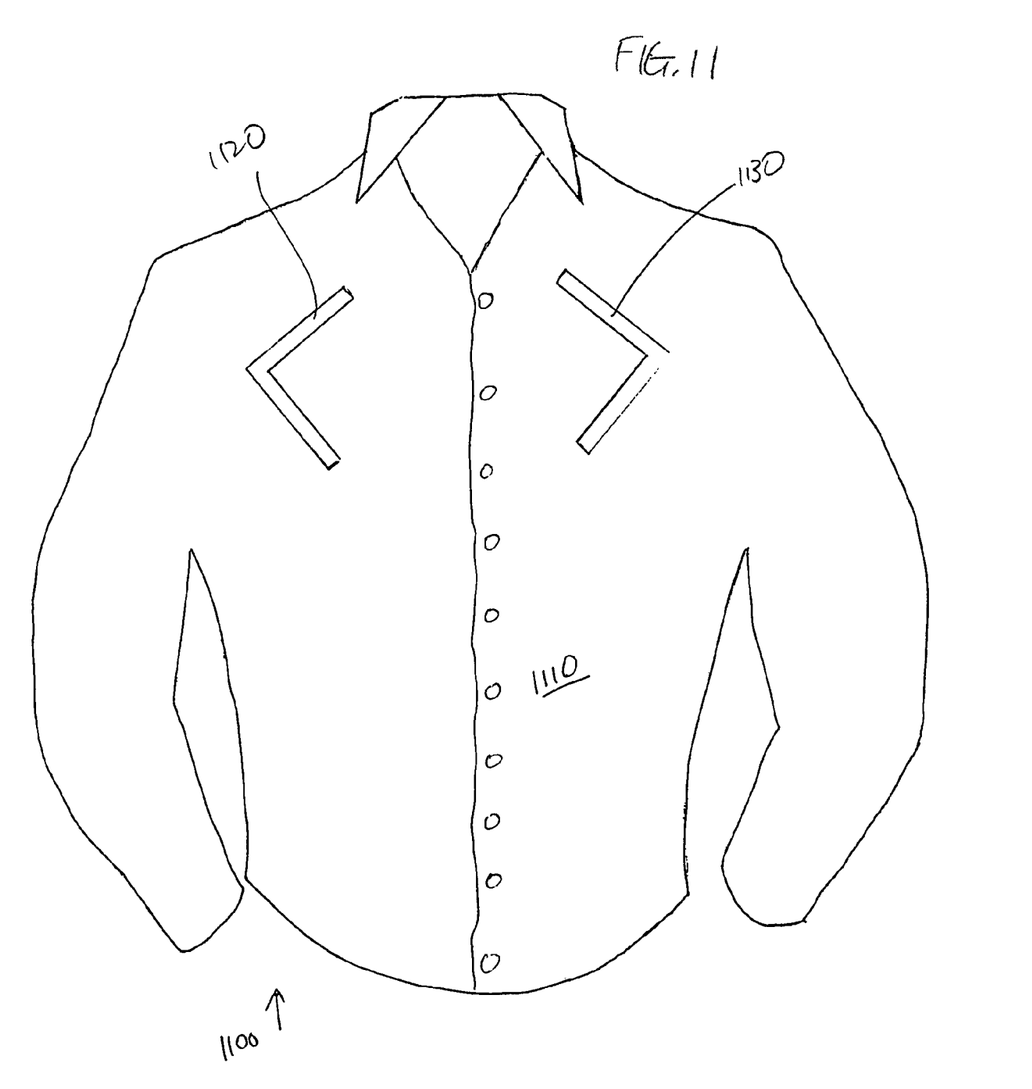
FIG. 11 is a perspective view showing the front portion of an eighth embodiment of Applicants' instrumented garment.

Referring now to FIG. 11, garment 1100 includes front portion 1110, light emitter 1120, and light emitter 1130. In certain embodiments, light emitter 1120 emits a white color light. In certain embodiments, light emitter 1120 emits an amber colored light. In certain embodiments, light emitter 1130 emits a white color light. In certain embodiments, light emitter 1130 emits an amber colored light.

Garment 1100 further includes circuitry and one or more power sources such that visible light emitter 1120 and visible light emitter 1130, can be remotely operated, either singly or in combination. For certain purposes, visible light emitter 1120 can be operated separately from visible light emitter 1130. In certain embodiments, upon being remotely activated visible emitter 1120 flashes on and off periodically. In certain embodiments, upon being remotely activated visible emitter 1130 flashes on and off periodically. In these embodiments, visible light emitter 1120 and visible light emitter 1130 can function as turn signals when the garment's wearer is operating, for example, a motorcycle or a bicycle.

Figure 12:
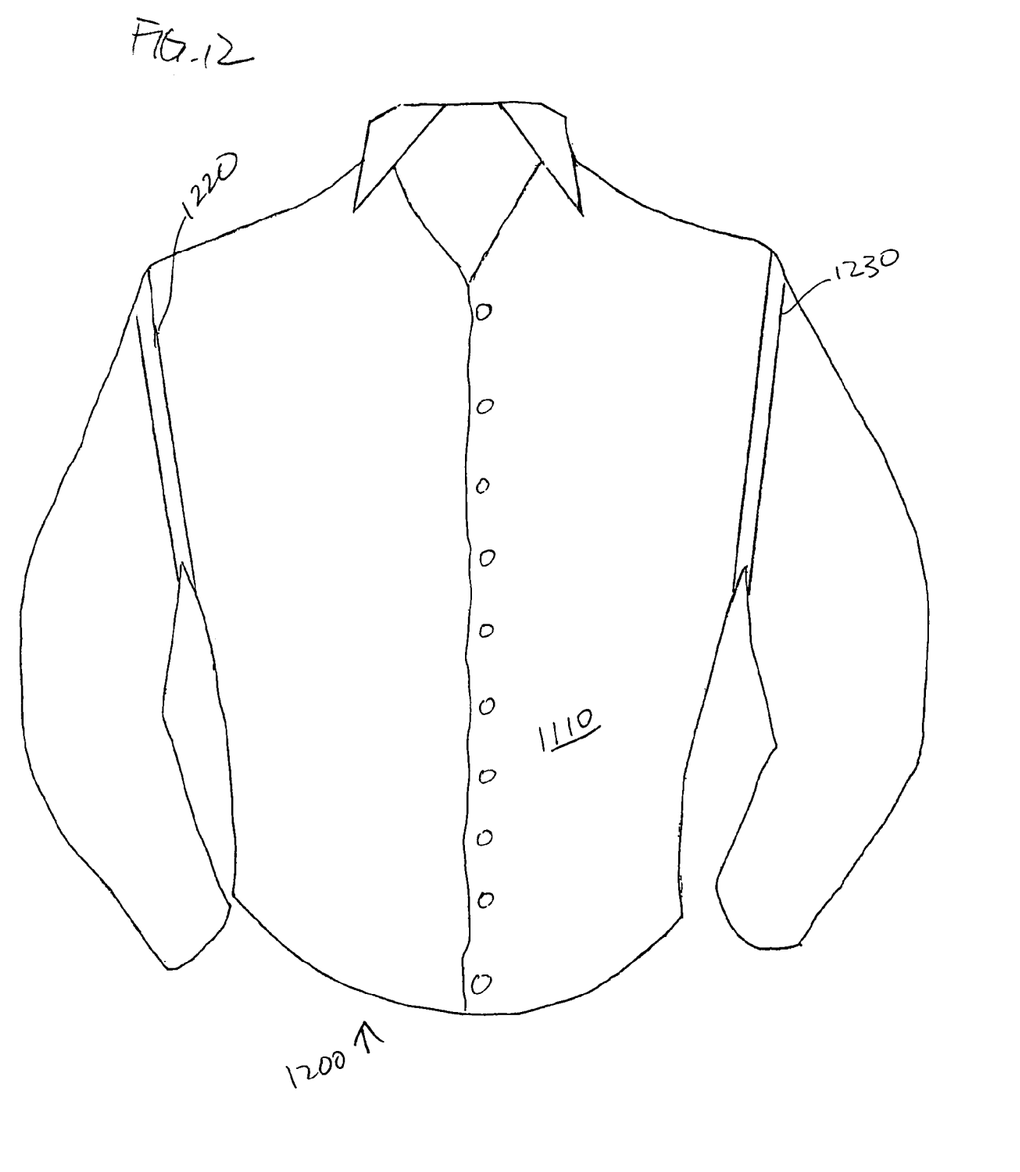
FIG. 12 is a perspective view showing the back portion of a ninth embodiment of Applicants' instrumented garment.

Referring now to FIG. 12, garment 1200 includes front portion 1110, light emitter 1220, and light emitter 1230. In certain embodiments, light emitter 1220 emits a white color light. In certain embodiments, light emitter 1220 emits an amber colored light. In certain embodiments, light emitter 1230 emits a white color light. In certain embodiments, light emitter 1230 emits an amber colored light.

Garment 1200 further includes circuitry and one or more power sources such that visible light emitter 1220 and visible light emitter 1230, can be remotely operated, either singly or in combination. For certain purposes, visible light emitter 1220 can be operated separately from visible light emitters 1230. In certain embodiments, upon being remotely activated visible emitter 1220 flashes on and off periodically. In certain embodiments, upon being remotely activated visible emitter 1230 flashes on and off periodically. In these embodiments, visible light emitter 1220 and visible light emitter 1230 can function as turn signals when the garment's wearer is operating, for example, a motorcycle or a bicycle.

Figure 5:
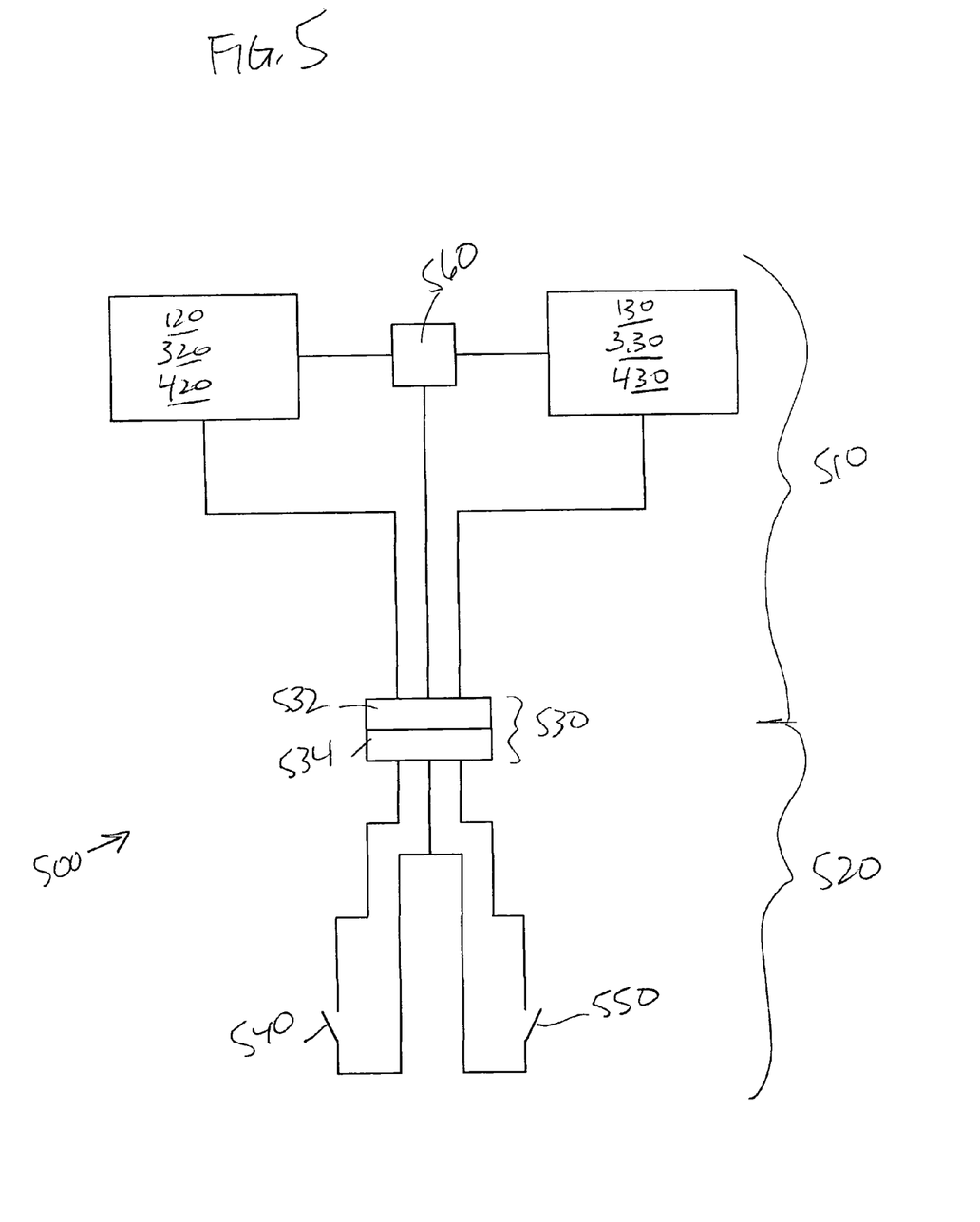
FIG. 5 is a block diagram showing a first embodiment of the control circuitry used to operate Applicants' instrumented garment.

Applicant's invention further includes certain power and circuitry to allow remote operation of the various visible light emitters disposed on garments 100, 200, 300, 400, 800, 900, 1000, 1100, and 1200. Referring to FIG. 5, Applicant's control network 500 includes portion 510 disposed on/in Applicant's instrumented garment and portion 520 disposed on the motorcycle/bicycle.

Portion 510 includes the various light emitting devices described above with reference to garments 100, 200, 300, 400, 800, 900, 1000, 1100, and 1200. In addition portion 510 further includes a power source 560. In certain embodiments, power source 560 includes one or more batteries. In certain embodiments, those one or more batteries are rechargeable. In certain embodiments, power source 560 further includes one or more solar cells capable of receiving solar energy and converting that solar energy into electrical current. That electrical current is used to recharge the one or more rechargeable batteries. Portion 510 further includes plug module 532.

Portion 520 includes switch 540 and switch 550. In certain embodiments, switch 540 comprises a first turn signal switch and switch 550 comprises a second turn signal switch. Activating switch 540 causes Applicant's circuitry to generate a first signal, where that first signal causes one or more light emitter/light emitter assembly to flash on and off indicating a turn from a first direction to a second direction. Activating switch 550 causes Applicants' circuitry to generate a second signal, where that second signal causes one or more light emitter/light emitter assembly to flash on and off indicating a turn from the first direction to a third direction.

In certain embodiments, switch 540 in combination with switch 550 comprises a portion of a brake activation mechanism, where that brake activation mechanism further includes a brake pedal and/or one or more brake levers. Depressing the brake pedal, and/or moving the one or more brake levers, causes, inter alia, Applicant's circuitry to generate a third signal, where that third signal causes switches 540 and 550 to remain closed as long as the brake mechanism remains activated. As long as the brake mechanism remains activated, one or more light emitters/light emitter assemblies continuously emit light.

In certain embodiments, switch 540 in combination with switch 550 comprises a portion of an emergency flasher mechanism, where that emergency flasher mechanism further comprises an activating switch. Activating that emergency flasher mechanism switch causes Applicants' circuitry to generate a fourth signal, where that fourth signal causes switches 540 and 550 to intermittently open and close as long as the emergency flasher mechanism is activated. As long as the emergency flasher mechanism remains activated, one or more light emitters/light emitter assemblies intermittently emit light.

Portion 520 further includes plug module 534. Portions 510 and 520 are releaseably connected using releaseable connector 530 which comprises plug module 532 in combination with plug module 534. When switch 540 is closed, i.e. when the garment's wearer turns on the left turn signal, light emitter left turn. Similarly, when switch 550 is closed, i.e. when the garment's wearer turns on the right turn signal, light emitter 130/330/430 is caused to flash on and off to indicate the wearer/operator's intent to make a right turn.

Figure 6:
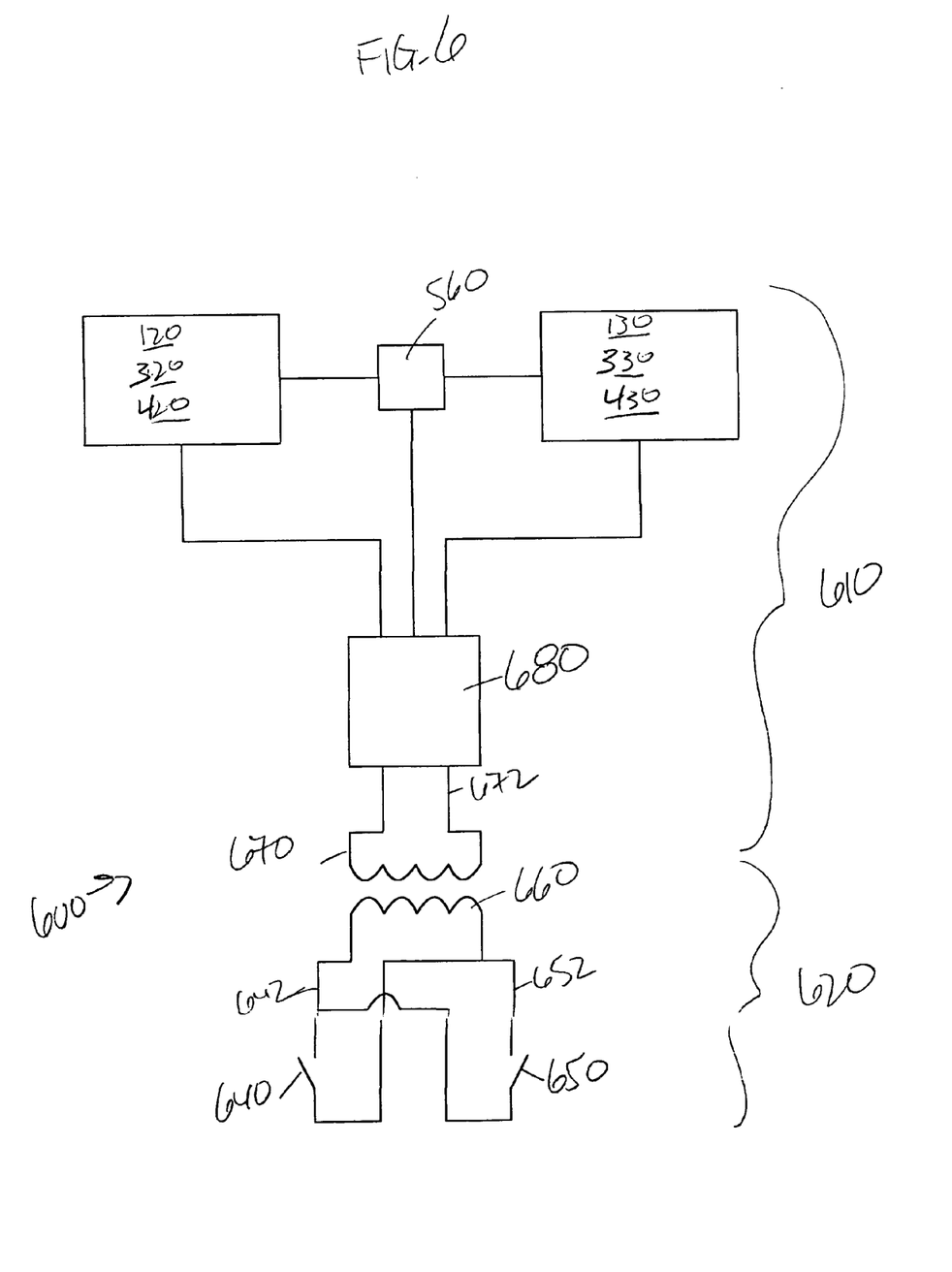
FIG. 6 is a block diagram showing a second embodiment of the control circuitry used to operate Applicants' instrumented garment.

Referring to FIG. 6, Applicant's control network 600 includes portion 610 disposed on/in Applicant's instrumented garment and portion 620 disposed on the motorcycle/bicycle.

Portion 610 includes the various light emitting devices described above with reference to garments 100, 200, 300, 400, 800, 900, 1000, 1100, and 1200. In addition portion 610 further includes a power source 560. In certain embodiments, power source 560 includes one or more batteries. In certain embodiments, those one or more batteries are rechargeable. In certain embodiments, power source 560 further includes one or more solar cells capable of receiving solar energy and converting that solar energy into electrical current. That electrical current is used to recharge the one or more rechargeable batteries. Portion 510 further includes first coil 670 and detector circuit 680.

Portion 620 includes switch 640 and switch 650. Portion 620 further includes second coil 660. Portions 610 and 620 operate in combination with one another without being physically interconnected. Rather, first coil 670 is disposed in/on the bottom portion 101 (FIG. 1) of Applicant's garment. Second coil 660 is disposed adjacent the seat portion of the motorcycle/bicycle such that first coil 670 is disposed in near proximity to second coil 660 when the garment wearer operates the motorcycle/bicycle. First coil 670 in combination with second coil 660 comprise an air core transformer.

When switch 640 is closed, circuit 642 is completed. Because coil 660 and coil 670 are inductively coupled, closing circuit 642 causes a first impedance change in circuit 672. Detector 680 detects this first impedance change and causes one or more first emitters/light emitter assemblies, to emit light.

When switch 650 is closed, circuit 652 is completed. Because coil 660 and coil 670 are inductively coupled, closing circuit 652 causes a second impedance change in circuit 672. Detector 680 detects this second impedance change and causes one or more second emitters/light emitter assemblies, to emit light.

In certain embodiments, switches 640 and 650 comprise a portion of a vehicle's turn signal mechanism, and a portion of a vehicle's brake activation mechanism, and a portion of a vehicle's emergency flasher mechanism, as described above with reference to switches 540 and 550.

Figure 7:
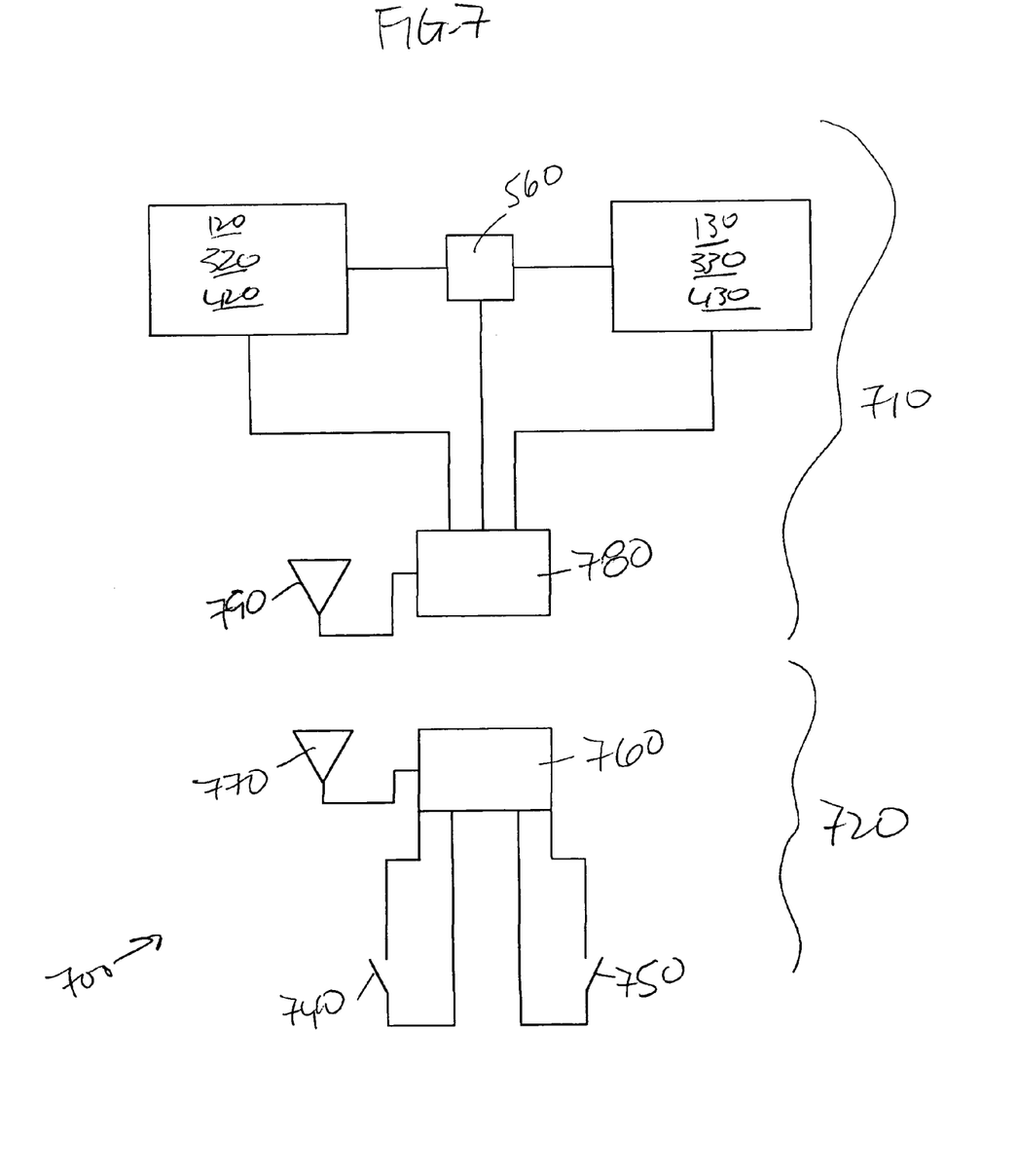
FIG. 7 is a block diagram showing a third embodiment of the control circuitry used to operate Applicants' instrumented garment.

Referring to FIG. 7, Applicant's control network 700 includes portion 710 disposed on/in Applicant's instrumented garment and portion 720 disposed on the motorcycle/bicycle.

Portion 710 includes the various light emitting devices described above with reference to garments 100, 200, 300, 400, 800, 900, 1000, 1100, and 1200. In addition portion 710 further includes a power source 560. In certain embodiments, power source 560 includes one or more batteries. In certain embodiments, those one or more batteries are rechargeable. In certain embodiments, power source 560 further includes one or more solar cells capable of receiving solar energy and converting that solar energy into electrical current. That electrical current is used to recharge the one or more rechargeable batteries. Portion 710 further includes radio receiver 780 and optionally antenna 790.

Portion 720 includes switch 740 and switch 750. Portion 520 further includes radio transmitter 760, and optionally antenna 770. When switch 740 is closed, transmitter 760 emits a first signal. Receiver 780 detects this first signal and causes one or more first emitters/emitter assemblies, to emit light. When switch 750 is closed, transmitter 760 emits a second signal. Receiver 780 detects this second signal and causes one or more second emitters/emitter assemblies, to emit light.

In certain embodiments, switches 640 and 650 comprise a portion of a vehicle's turn signal mechanism, and a portion of a vehicle's brake activation mechanism, and a portion of a vehicle's emergency flasher mechanism, as described above with reference to switches 540 and 550. In certain embodiments, Applicant's control network 700 utilizes the Bluetooth wireless specification. Unlike many other wireless standards, the Bluetooth wireless specification includes both link layer and application layer definitions for product developers which supports data, voice and content-centric applications. Radios that comply with the Bluetooth wireless specification operate in the unlicensed, 2.4 GHz radio spectrum ensuring communication compatibility worldwide. These radios use a spread spectrum, frequency hopping, full-duplex signal at up to 1600 hops/sec. The signal hops among 79 frequencies at 1 MHz intervals to give a high degree of interference immunity. Up to seven simultaneous connections can established and maintained.

The Bluetooth Specification contains the information necessary to ensure that diverse devices supporting the Bluetooth wireless technology can communicate with each other worldwide. The document is divided into two sections: a Core Specification (Volume I) and Profile Definitions (Volume II).

In certain embodiments, Applicant's light emitting devices/light emitting assemblies 120, 130, 320, 330, 420, 430, 820, 830, 920, and 930, comprise four square inches or more of display area. By "display area," Applicant means the aggregate area for each emitter/assembly that emits light.

While the preferred embodiments of the present invention have been illustrated in detail, it should be apparent that modifications and adaptations to those embodiments may occur to one skilled in the art without departing from the scope of the present invention as set forth in the following claims.

I claim:

1. A garment, comprising:
   a vest portion, comprising a front portion and a back portion;
   a first light emitting device disposed on said back portion;
   a second light emitting device disposed on said back portion;
   a first coil interconnected with a circuit comprising an impedance, wherein said circuit is interconnected with said detector;
   wherein said first coil can be inductively coupled with a second coil disposed on a vehicle and interconnected with a turn signal switch such that closing said turn signal switch causes an impedance change in said circuit;
   a detector interconnected with said first light emitting device and with said second light emitting device, wherein said detector detects the impededance change and causes the first or second light emitting device to emit light.

2. The garment of claim 1, wherein said first light emitting device comprises a first light emitting diode, and wherein said first light emitting diode is capable of emitting a red color, and wherein second first light emitting device comprises a second light emitting diode, and wherein said second light emitting diode is capable of emitting a red color.

3. The garment of claim 1, further comprising a third light emitting device disposed on said back portion.

4. The garment of claim 3, wherein said third light emitting device comprises a third light emitting diode, and wherein said third light emitting diode is capable of emitting a white color.

5. The garment of claim 3, wherein said vehicle comprises a power source, further comprising:
   a first power conduit interconnecting said power source and said first light emitting device;
   a second power conduit interconnecting said power source and said second light emitting device;
   a third power conduit interconnecting said power source and said third light emitting device.

6. The garment of claim 3, further comprising:
   a power source;
   a first power conduit interconnecting said power source and said first light emitting device;
   a second power conduit interconnecting said power source and said second light emitting device.

7. The garment of claim 3, further comprising:
   a first housing, wherein said first housing defines a first enclosure having a first open end, and wherein said first light emitting device is disposed in said first enclosure;
   a first lens, wherein said first lens is disposed over said first open end, and wherein said first lens comprises a red color;
   a second housing, wherein said second housing defines a second enclosure having a second open end, and wherein said second light emitting device is disposed in said second enclosure;
   a second lens, wherein said second lens is disposed over said second open end, and wherein said second lens comprises a red color;
   a third housing, wherein said third housing defines a third enclosure having a third open end, and wherein said third light emitting device is disposed in said third enclosure;
   a third lens, wherein said third lens is disposed over said third open end, and wherein said third lens is optically clear.

8. The garment of claim 3, further comprising:
   a fourth light emitting device disposed on said front portion;
   a fifth light emitting device disposed on said back portion;
   wherein said fourth light emitting device is capable of receiving said first signal;
   wherein said fifth light emitting device is capable of receiving said second signal.

9. The garment of claim 8, wherein said fourth light emitting device comprises a fourth light emitting diode, and wherein said fourth light emitting diode is capable of emitting an amber color, and wherein fifth light emitting device comprises a fifth light emitting diode, and wherein said fifth light emitting diode is capable of emitting an amber color.

10. The garment of claim 9, further comprising:
    a fourth housing, wherein said fourth housing defines a fourth enclosure having a fourth open end, and wherein said fourth light emitting device is disposed in said fourth enclosure;
    a fourth lens, wherein said fourth lens is disposed over said fourth open end, and wherein said fourth lens comprises an amber color;

a fifth housing, wherein said fifth housing defines a fifth enclosure having a fifth open end, and wherein said fifth light emitting device is disposed in said fifth enclosure;

a fifth lens, wherein said fifth lens is disposed over said fifth open end, and wherein said fifth lens comprises an amber color.

11. A method to operate a vehicle comprising one or more wheels and one or more turn signal switches, comprising the steps of:

providing a license plate;

operating said vehicle in a first direction;

supplying a garment comprising a vest portion which includes a front portion and a back portion, a first light emitting device disposed on said back portion, a second light emitting device disposed on said back portion, and a third light emitting device disposed on said back portion, wherein said first light emitting device is capable of receiving a first signal provided by said vehicle, and wherein said second light emitting device is capable of receiving a second signal provided by said vehicle;

disposing said license plate adjacent said third light emitting device, such that said third light emitting device is capable of illuminating said license plate;

activating said one or more turn signal switches to indicate a turn in a second direction;

generating a first signal;

providing said first signal to said first light emitting device;

flashing said first light emitting device on and off.

12. The method of claim 11, further comprising the steps of:

activating one of said one or more turn signal switches to indicate a turn in a third direction;

generating a second signal;

providing said second signal to said second light emitting device;

flashing said second light emitting device on and off.

13. The method of claim 11, wherein said vehicle further comprises a brake mechanism, further comprising the steps of:

activating said brake mechanism;

generating a third second signal as long as said brake mechanism remains activated;

providing said third signal to said first light emitting device;

providing said third signal to said second light emitting device;

continuously illuminating said first light emitting device and said second light emitting device.

14. The method of 11, wherein said vehicle further comprises an emergency flasher switch, further comprising the steps of:

activating said emergency flasher switch;

generating a fourth signal;

providing said fourth signal to said first light emitting device;

providing fourth to said second emitting device;

flashing said first light emitting device on and off; and flashing said second light emitting device on and off.

15. The method of claim 11, wherein said supplying step further includes supplying a garment which further includes two sleeves.

16. The method of claim 15, wherein said supplying step further includes supplying a garment which further includes a collar.

17. The method of claim 11, wherein said supplying step further comprises supplying a garment which further includes a fourth light emitting device disposed on said front portion and a fifth light emitting device disposed on said back portion, wherein said fourth light emitting device is capable of receiving said first signal and wherein said fifth light emitting device is capable of receiving said second signal;

providing said first signal to said first light emitting device and said fourth light emitting device;

flashing said first light emitting device and said fourth light emitting device on and off.

18. The method of claim 17, further comprising the steps of:

providing said second signal to said second light emitting device and to said fifth light emitting device;

flashing said second light emitting device and said fifth light emitting device on and off.

19. The method of claim 17, wherein said vehicle further comprises a brake mechanism, further comprising the steps of:

activating said brake mechanism;

generating a third signal as long as said brake mechanism remains activated;

providing said third signal to said first light emitting device and to said fourth light emitting device;

providing said third signal to said second light emitting device and to said fifth light emitting device;

continuously illuminating said first light emitting device, said second light emitting device, said fourth light emitting device and said fifth light emitting device.

20. The method of claim 17, wherein said vehicle further comprises an emergency flasher mechanism, further comprising the steps of:

activating said emergency flasher mechanism;

generating an intermittent first signal and an intermittent second signal as long as said emergency flasher mechanism remains activated;

providing said intermittent first signal to said first light emitting device and to said fourth light emitting device;

providing said intermittent second signal to said second light emitting device and to said fifth light emitting device;

intermittently illuminating said first light emitting device, said second light emitting device, said fourth light emitting device, and said fifth light emitting device.

* * * * *